E. B. GRIFFIN.
FASTENING FOR DOOR KNOBS.
APPLICATION FILED MAR. 7, 1912.
1,070,451.
Patented Aug. 19, 1913.
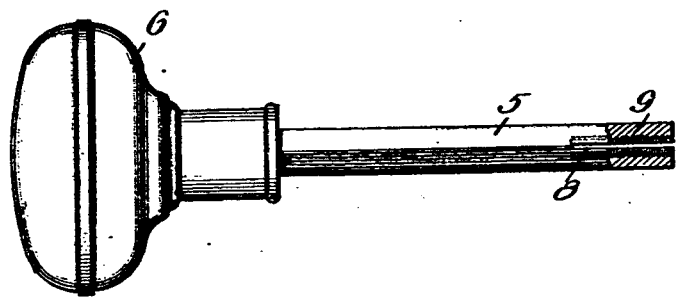
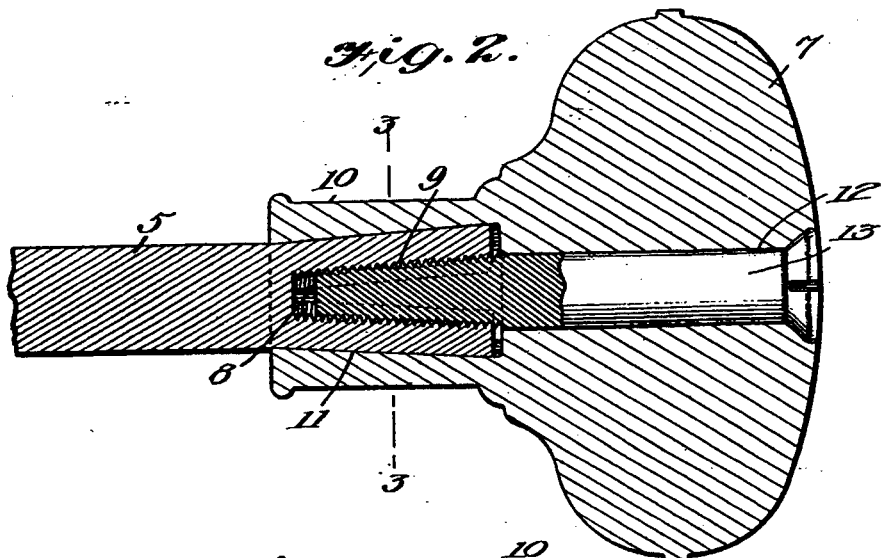
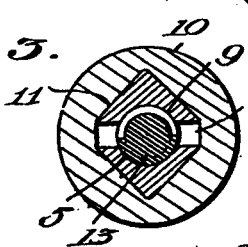
WITNESSES
INVENTOR
Edward B. Griffin

UNITED STATES PATENT OFFICE.

EDWARD B. GRIFFIN, OF SOMERVILLE, MASSACHUSETTS.

FASTENING FOR DOOR-KNOBS.

1,070,451.

Specification of Letters Patent.   Patented Aug. 19, 1913.

Application filed March 7, 1912.   Serial No. 682,103.

*To all whom it may concern:*

Be it known that I, EDWARD B. GRIFFIN, a citizen of the United States, residing at Somerville, in the county of Middlesex and State of Massachusetts, have invented certain new and useful Improvements in Fastenings for Door-Knobs, of which the following is a specification.

This invention relates to door-knobs and the like, and has for its object to provide a simple and efficient means for fastening the same to the spindle.

The invention also has for its object to provide a fastening which will render impossible the removal of the knob and its spindle from the outside of the door.

With these and other objects in view, as will appear when the nature of the invention is better understood, the same consists in a novel construction and arrangement of parts to be hereinafter described and claimed.

In the accompanying drawing, Figure 1 is an elevation of the spindle, partly broken away; Fig. 2 is a longitudinal section showing the means for fastening the knob to the spindle, and Fig. 3 is a cross-section on the line 3—3 of Fig. 2.

Referring specifically to the drawing, 5 denotes a knob-spindle having at one of its ends a knob 6 which is formed integral with the spindle for a purpose to be presently described. To the other end of the spindle is attached a knob 7, the fastening of which is so constructed that neither said knob nor the spindle can be removed from the outside of the door.

The fastening comprises the following parts: The end of the spindle 5 carrying the knob 7 is split longitudinally for a short distance, as indicated at 8, and has a central longitudinal bore 9 which is screw-threaded and intersected by the split. The spindle is square in cross-section and the split extends diagonally from corner to corner. The knob 7 has a shank 10 provided with a longitudinal bore 11 to receive the spindle 5, and from the outside of the knob, a bore 12 extends to the bore 11. The bore 12 is in axial alinement with the bore 9 when the knob is on the spindle, and a screw 13 passes through the former and is screwed into the latter bore, that portion of the screw which enters the last-mentioned bore being tapered. The diameter of the larger portion of the screw is greater than the diameter of the bore 9, in view of which the split portion of the spindle will spread when the screw enters the same, and said portion of the spindle will therefore be tightly wedged in the bore 11. Inasmuch as the spindle is split diagonally, the bore will be filled more completely by the expanding portion of the spindle. The bore 11 is also tapered for the same purpose. The shank 10 may be formed integral with the knob 7, or separate, and secured thereto in any suitable manner. The head of the screw 13 is countersunk in the knob. If the spindle is made of softer metal than the screw, the bore 9 need not be screw-threaded, as the screw will cut a thread in the bore when it enters the same.

In applying the structure herein described, the knob 6 will be in the outside of the door, in view of which it will be impossible to remove it from this side of the door. A pull on either knob tightens the fastening.

The advantages of the fastening herein described are that it can be easily and quickly applied, thus saving time and labor, it has a smaller number of parts than the ordinary knob fastening, one screw only being required, and it securely fastens the knob in place on the spindle, so that it is not liable to work loose. The fastening can also be applied to handles for dressers, drawers, etc.

I claim:

The combination with a door knob provided with a tapering recess having its major diameter at its inner end, said knob being further provided with an opening leading from the inner end of the recess to the outer face of the knob, the outer end of the opening being enlarged to provide a shoulder within the knob; of a spindle provided with a split end, said spindle further having the inner sides of the split portion provided with screw threads, and a tapering screw passing through said opening and engaging said screw thread in the spindle, said screw having a head on its outer end bearing on the shoulder in the knob, whereby said screw is adapted to simultaneously draw said spindle into said recess and expand the split portion.

In testimony whereof I affix my signature in presence of two witnesses.

EDWARD B. GRIFFIN.

Witnesses:
AGNES W. GRIFFIN,
LOUISE C. ARENTZEN.